Sept. 16, 1969  K. TRISCHBERGER  3,467,860
MOISTURE CONTENT SENSING PROBE INCLUDING WIPER MEANS
FOR CONTINUOUS WIPING OF TEST MATERIAL
FROM PROBE SURFACE
Filed Dec. 29, 1966

INVENTOR
KARL TRISCHBERGER

BY
Mason, Porter, Diller & Brown
ATTORNEYS

United States Patent Office 3,467,860
Patented Sept. 16, 1969

3,467,860
MOISTURE CONTENT SENSING PROBE INCLUDING WIPER MEANS FOR CONTINUOUS WIPING OF TEST MATERIAL FROM PROBE SURFACE
Karl Trischberger, 24 an der Windmuhle, 516 Dueren, Germany
Filed Dec. 29, 1966, Ser. No. 605,687
Claims priority, application Germany, Jan. 3, 1966, T 30,211
Int. Cl. G01r 27/02, 27/26
U.S. Cl. 324—61                 12 Claims

ABSTRACT OF THE DISCLOSURE

Apparatus for determining the moisture content of bulk material being conveyed along a predetermined path comprising an electrical condenser the plates of which provide a generally planar surface for the collection of the bulk material. The dielectric losses between such plates are dependent upon the moisture content of the collected bulk material and such losses are utilized to provide an indication of the moisture content. A wiper, movably disposed above the planar surface, continuously removes the bulk material from the surface and a guide housing positioned above the planar surface and the wiper guides the bulk material onto the condenser surface and maintains a back-up of material above such surface.

---

This invention relates in general to new and improved apparatus for the measurement of the moisture content of bulk material and more specifically to apparatus capable of providing a consistent quantity of bulk material to a device suitable for the measurement of the dielectric qualities of the bulk material during conveyance of such material along a predetermined path.

At the present time it is common to utilize electrical condensers to determine the moisture content of bulk material being conveyed past such condensers by monitoring losses between condenser plates resultant from the effect of moisture upon the dielectric qualities of the bulk material. Condensers utilized in the aforementioned process often comprise a series of condenser plates disposed adjacent one another to provide a generally planar or flat surfaces. The plates comprising such condensers may be a series of flat rectangular portions or may be a series of concentric annular or ring-like portions comprising what is commonly called a guard ring condenser.

Condensers of the aforementioned type are, at the present time, commonly placed in oblique chutes or passages disposed adjacent the end of bulk material conveying belts or screw type conveyors and, furthermore, the bulk material to be monitored is generally in a free-fall condition or is being pneumatically driven as it moves past the moisture monitoring condenser.

Heretofore it has been extremely difficult, if not impossible, to control the flow of moisture containing bulk material past the condenser such that the entire surface or planar portion of the condenser was at all times completely covered by the flow of material therepast. Changes in speed of the conveying means and changes in the amount of material being conveyed invariably have resulted in an uneven covering of the planar portion of the condensers of the aforementioned type. Consequently, electrical losses between adjacent plates of the condenser have been affected by the failure of the bulk material to homogeneously cover the entirety of the surface area of the planar portion of the condenser and these losses have further been affected by the variations in concentration or depth of bulk material passing such surface area.

In view of the foregoing it is a primary object of this invention to provide apparatus for measuring the moisture content of bulk material capable of providing a true indication of such moisture content despite changes in the flow rate or discontinuities in the flow of bulk material past the apparatus.

It is another object of this invention to provide in a bulk material conveying system having a free-fall or pneumatic stretch, apparatus for measuring the moisture content of the bulk material within such stretch including a measuring condenser having a generally planar surface for the collection of bulk material thereon and a movable wiper mounted above the planar surface for continuously wiping the collected bulk material from the surface.

A further object of this invention is to provide apparatus of the aforementioned type wherein the wiper means comprises a wiper centrally rotatably mounted above the planar surface of the electrical condenser.

Still another object of this invention is to provide apparatus of the aforementioned type wherein the wiper is mounted for rotation in one direction and is curved away from the direction of rotation to provide a convex leading side of the wiper.

Yet another object of this invention is to provide apparatus of the aforementioned type wherein a guide housing is disposed above the planar surface of the condenser to guide the bulk material onto the surface of the condenser and maintain a back-up or pile-up of bulk material upon such surface.

A further object of this invention is to provide apparatus of the aforementioned type wherein the guide housing is in the form of a conduit having an opening of downwardly increasing cross section formed therethrough to assure an even distribution of bulk material upon the planar surface of the condenser.

A still further object of this invention is to provide moisture measuring apparatus of the aforementioned type wherein the guide housing is movably disposed above the planar surface of the condenser to allow adjustment of the distance between the guide housing and the surface as determined by the grade or texture of bulk material being conveyed.

With the above and other objects in view that will hereinafter appear, the nature of the present invention will be more clearly understood by reference to the following detailed description, the appended claims and the several views illustrated in the accompanying drawings.

Figure 1:
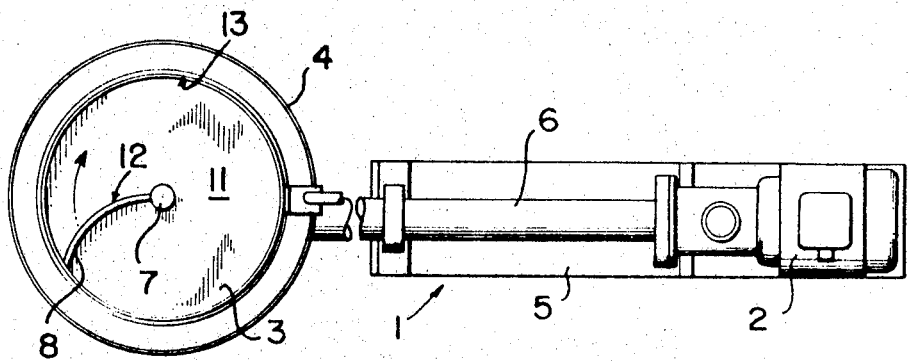
FIGURE 1 is a top plan view showing a planar surface of a condenser, a guide housing, a wiper blade and wiper blade driving means.
Figure 2:
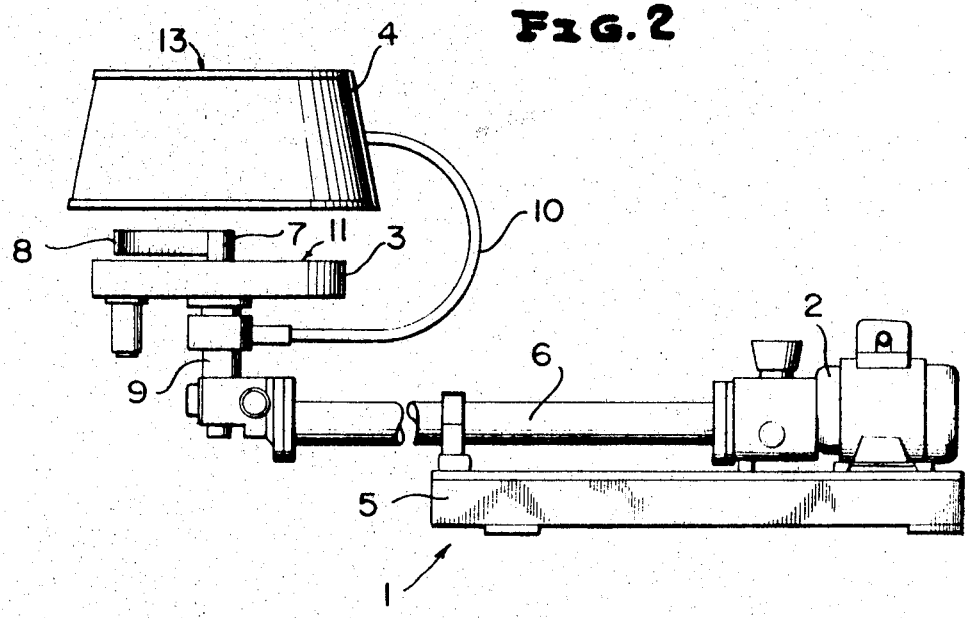
FIGURE 2 is a front elevational view showing, more clearly, the disposition of the guide housing and the wiper with respect to the condenser and wiper driving means.

Referring now to the drawings in detail, it will be seen that there is shown in FIGURE 1 a measuring condenser 3 suitable for connection to electrical measuring instruments (not shown). The manner of connection of condenser 3 to such measuring instruments and the type of instruments employed are well known and, thus, are not considered to be essential in matter of the present disclosure. The measuring condenser 3 may be formed in any of a number of known configurations such as to provide a relatively flat planar surface 11 suitable for the collection of bulk material thereon. The condenser 3 comprises a series of condenser plates (not shown), again well known for use in the determination of the moisture content of bulk material. The condenser plates may be arranged in any of a number of configurations, as for example, a number of side-by-side rectangular condenser plates which combine to form a generally rectangular surface or, preferably in this embodiment, a number of concentric ring-like or annular plates having upper surfaces which form the generally circular planar surface 11. Electrically, the plates may be arranged such that certain ones of the plates are energized from a high frequency source while adjoining plates are maintained essentially unenergized. Losses incurred in the measuring condenser 3 will result from the leakage field between plates of the condenser as determined by the dielectric properties of the bulk material presented to surface 11. In the case of rlatively moist bulk material, losses resultant from the utilization of relatively high frequencies will be proportional to the water or moisture content of the bulk material.

Disposed adjacent the upper planar surface 11 of the condenser 3 is a wiper or wiper arm 8 rotatably mounted by a wiper arm drive shaft 7 which passes through the condenser 3. The wiper 8 is shown as being adapted for rotation in a clockwise direction as seen in FIGURE 1. It will be noted that the wiper or wiper arm 8 is curved away from the direction of rotation such as to provide a convex leading side or face 12. The curvature of wiper arm 8, as seen in FIGURE 1, insures removal of bulk material from the face or planar surface 11 of the measuring condenser 3 by providing an outward displacement of such bulk material from the center of surface 11 toward the edges thereof.

The measuring condenser 3 and wiper 8 are supported upon a rigid support fixture 9 through which the wiper drive shaft 7 communicates with the wiper or wiper arm 8. Support fixture 9 is, in turn, supported by a pipe housing 6 which is mounted upon a frame or mount, generally referred to by the numeral 1. The frame or mount 1 comprises a mounting bracket 5 which supports a rotary motion imparting device or motor 2 suitable for providing the required rotary motion to wiper arm 8.

The rotary motion imparting device or motor 2 communicates, as by suitable gearing mechanism with a primary drive shaft (not shown) which is housed in pipe housing 6. A bevel gear mechanism or other suitable connecting device is provided to impart the rotary movement of the primary drive shaft to the wiper arm drive shaft 7.

Mounted upon support 9 is an adjustable arm 10 which maintaining a bulk material guide housing 4 a suitable predetermined distance above the planar surface 11 of condenser 3. The guide housing 4 is mounted with respect to the flow of bulk material such as to direct a portion of such flow onto the surface 11 of condenser 3.

The guide housing 4 is formed with an opening or passage 13 suitable for directing the bulk material downwardly onto the surface 11. Preferably opening 13 is of downwardly increasing cross sectional area to provide an even distribution of material upon surface 11. That is, the utilization of the downwardly increasing cross sectional area or frusto-conical configuration of opening 13 prevents the formation of bridges, hollow spaces and air gaps resultant from a clinging of bulk material to the sides of the guide housing 4. The portion of opening 13 of smallest cross sectional area is preferably larger than the area of planar surface 11 in order to provide a complete and even distribution of material upon surface 11. Further, opening 13 and guide housing 4 are either rectangular or circular in cross section, dependent upon the configuration of surface 11.

In operation bulk material is directed through a freefall or pneumatic stretch of a conveying system as, for example, by the utilization of the commonly employed flow directing chute. The condenser 3, wiper 8 and guide housing 4 are located within the aforementioned stretch of the conveying system such that a portion or all of the bulk material being so conveyed passes through the uppermost portion of opening 13 of guide housing 4.

Guide housing 4 assures a back-up or pile-up of bulk material which extends from surface 11 upwardly into guide housing 4. The speed at which wiper arm 8 rotates is adjusted to provide a continuous removal of bulk material from surface 11 and, accordingly, new material immediately replaces that material which has been directed outwardly off of surface 11. Guide housing 4 further assures an even distribution of bulk material upon surface 11 irrespective of variations in the flow of bulk material through the conveying system and, further, irrespective of air pockets and portions of uneven density within such flow of material. The position of guide housing 4 with respect to condenser 3 is adjusted in accordance with the coarseness of the bulk material under test and, thus, the measuring apparatus is rendered suitable for the measurement of moisture content within a wide variety of bulk material which may include, for example, wood shavings, dry vegetables, sand, textile fibers, granulated synthetic materials, coke and numerous further types of materials. In the case of relatively coarse material, such as wood shavings of about 5 cm. in length, a relatively large distance between surface 11 and the bottommost portion of guide housing 4 may be provided. On the other hand, in the case of relatively finely divided bulk material, for example, wool, a much lesser distance between surface 11 and guide housing 4 may be provided.

Utilization of the described measuring apparatus is further made suitable for use with a wide variety of bulk material by provision of a gear mechanism suitable to provide regulation of the speed of rotation of wiper arm 8.

Additionally, the proportion of the total flow of bulk material which passes through opening 13 in guide housing 4 is determined in dependence upon the total conveyor system flow. That is, in the case of a conveyor system having a relatively large flow-through capacity, the guide housing 4 is arranged to accept only a relatively small proportion of the total flow therepast, the remainder of the conveyor system flow by-passing the testing apparatus at each side of housing 4.

I claim:

1. In a bulk material conveying system; apparatus for test measuring the moisture content of the bulk material being conveyed including a measuring condenser having a planar surface disposed to receive and collect thereon a free falling column of said material from the path of travel of the bulk material along said conveying system to provide a dielectric for said material and having peripheral edge portions over which said material may be discharged, to continue along said path of travel and a continuously movable wiper means mounted adjacent to and above said surface for movement relative thereto for the continuous wiping of said bulk material from said surface and sweeping the same over said peripheral edge portions, whereby the dielectric losses of said condenser are dependent upon the moisture content of the collected bulk material and such losses are utilized to provide an indication of the moisture content.

2. Apparatus according to claim 1 further comprising a tubular guide housing means disposed over and spaced above said planar surface and said wiping means for guiding said bulk material onto said surface and confining at least a column portion of said material on said surface and yet leaving an annular free space through which tested material can be discharged as aforesaid.

3. Apparatus according to claim 2 wherein the opening downwardly through the housing is of downwardly increasing cross section thereby to assure an even distribution of bulk material upon said planar surface.

4. Apparatus according to claim 1 wherein said wiper means comprises a rotatably mounted wiper arm continuously swingable about an upright axis.

5. Apparatus according to claim 2 wherein said wiper means comprises a wiper arm continuously swingable about an upright axis.

6. Apparatus according to claim 4 further comprising a driving motor, a pipe housing firmly connected to said motor and a drive shaft disposed within said pipe housing for imparting rotational motion to said wiper arm from said motor, said measuring condenser and guide housing being supported by said pipe housing.

7. Apparatus according to claim 2 wherein said guide housing means is movably disposed above said planar surface for adjustment of the distance between said guide housing means and said surface.

8. Apparatus according to claim 3 wherein the cross sectional area of said opening at the smallest portion of said opening is at least as large as the area of said planar surface.

9. Apparatus according to claim 3 wherein said surface is circular and said guide housing means and opening are circular in cross section.

10. Apparatus according to claim 3 wherein said surface area corresponds generally in shape to the cross section of said guide housing.

11. Apparatus according to claim 6 further comprising speed changing means operatively interconnecting said motor and drive shaft thereby to vary the speed of the wiper arm according to the nature of the bulk material being tested.

12. Apparatus according to claim 4 wherein said wiper is mounted for rotation in one direction and is curved away from said one direction to provide a convex leading side on said wiper.

References Cited

UNITED STATES PATENTS

| | | | |
|---|---|---|---|
| 2,957,130 | 10/1960 | Dietert et al. | 324—61 |
| 3,136,009 | 6/1964 | Dietert et al. | 324—65 XR |
| 3,161,927 | 12/1964 | Dietert | 324—65 XR |
| 3,188,563 | 6/1965 | Jameson | 324—61 |
| 3,377,553 | 4/1968 | Lillard et al. | 324—61 |

EDWARD E. KUBASIEWICZ, Primary Examiner

U.S. Cl. X.R.

317—246